United States Patent [19]

O'Callaghan

[11] Patent Number: 5,093,213

[45] Date of Patent: * Mar. 3, 1992

[54] METAL-AIR BATTERY WITH RECIRCULATING ELECTROLYTE

[75] Inventor: Wilfrid B. O'Callaghan, Kingston, Canada

[73] Assignee: Alcan International Limited, Montreal, Canada

[*] Notice: The portion of the term of this patent subsequent to Mar. 13, 2007 has been disclaimed.

[21] Appl. No.: 640,531

[22] Filed: Jan. 10, 1991

Related U.S. Application Data

[63] Continuation of Ser. No. 463,383, Jan. 11, 1990, abandoned, which is a continuation of Ser. No. 248,383, Sep. 23, 1988, Pat. No. 4,908,281.

[30] Foreign Application Priority Data

Sep. 25, 1987 [CA] Canada .................................. 547843

[51] Int. Cl.⁵ .............................................. H01M 8/04
[52] U.S. Cl. ...................................... 429/27; 429/14; 429/28; 429/70; 429/120
[58] Field of Search ...................... 429/27, 14, 28, 70, 429/120

[56] References Cited

U.S. PATENT DOCUMENTS 3,915,745 10/1975 Ikeda et al. ........................ 429/27
4,490,443 12/1984 Ruch et al. ........................ 429/27
4,908,281 3/1990 O'Callaghan ...................... 429/27

Primary Examiner—Brian E. Hearn
Assistant Examiner—Maria Nuzzolillo
Attorney, Agent, or Firm—Cooper & Dunham

[57] ABSTRACT

A metal-air battery is described having recirculating electrolyte. The battery comprises: (a) a tank defining a reservoir for liquid electrolyte, (b) a support panel mounted in the tank above the electrolyte reservoir, (c) a plurality of individually removable metal-air cells mounted in side-by-side relationship on said support panel with air gaps therebetween, each cell comprising a pair of spaced-apart flat side walls joined by end faces and top and bottom faces, said side walls including air cathodes, a metal anode mounted between and spaced from said flat side walls, an electrolyte inlet connector below the lower edge of the anode and an electrolyte outlet connector, said connectors being adapted to removably extend through openings in said support panel, and said outlet connector being adapted to return electrolyte to the reservoir, and (d) circuit means for connecting said cells to an external load.

17 Claims, 3 Drawing Sheets

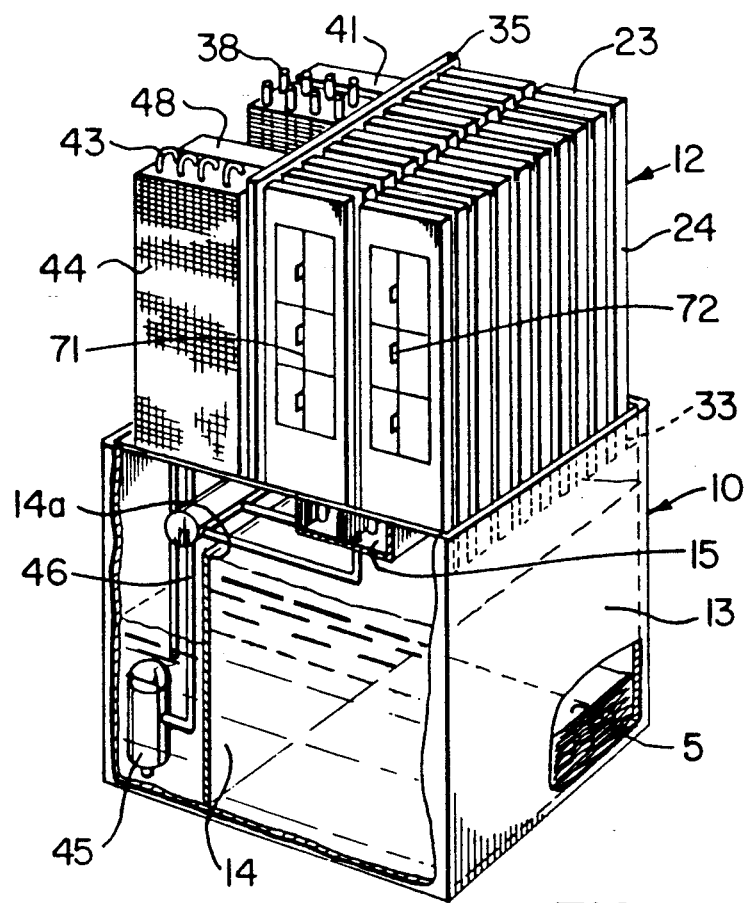
FIG. 1
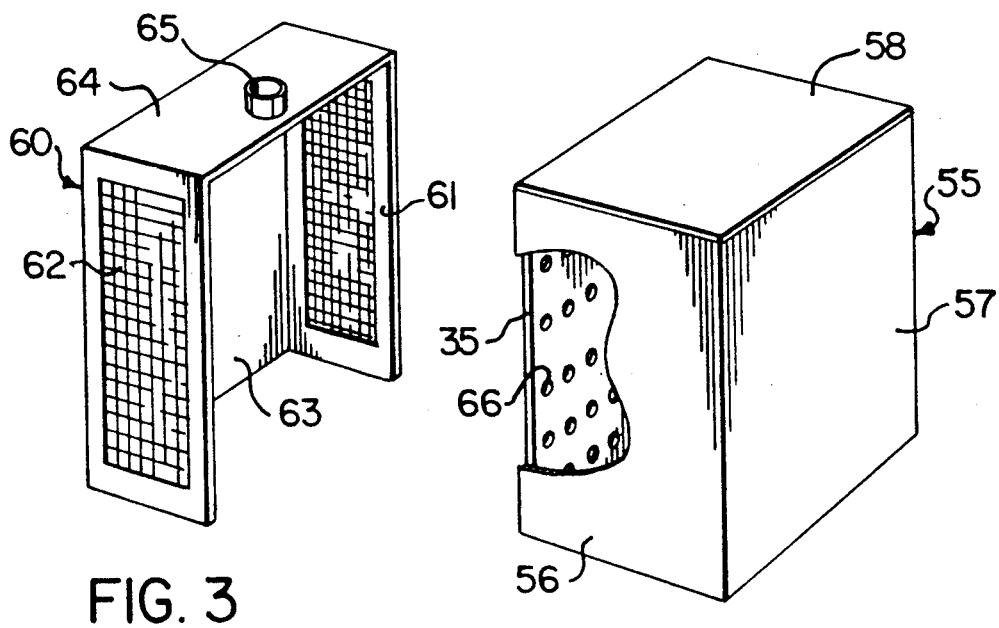
FIG. 3
FIG. 2

METAL-AIR BATTERY WITH RECIRCULATING ELECTROLYTE

This is a continuation of application Ser. No. 463,383, filed Jan. 11, 1990 now abandoned, which is a continuation of Ser. No. 248,383 filed Sept. 23, 1988 (now U.S. Pat. No. 4,908,281).

BACKGROUND OF THE INVENTION

The invention relates to metal/air batteries, and particularly such batteries having recirculating electrolyte.

Metal/air batteries produce electricity by the electrochemical coupling of a reactive metallic anode to an air cathode through a suitable electrolyte in a cell. The air cathode is typically a sheet-like member, having opposite surfaces respectively exposed to the atmosphere and to the aqueous electrolyte of the cell. During cell operation oxygen is reduced within the cathode while metal of the anode is oxidized, providing a usable electric current flow through external circuitry connected between the anode and cathode. The air cathode must be permeable to air but substantially impermeable to aqueous electrolyte, and must incorporate an electrically conductive element to which the external circuitry can be connected. Present-day commercial air cathodes are commonly constituted of active carbon (with or without an added dissociation-promoting catalyst) in association with a finely divided hydrophobic polymeric material and incorporating a metal screen as the conductive element. A variety of anode metals have been used or proposed; among them, zinc, alloys of aluminum and alloys of magnesium are considered especially advantageous for particular applications, owing to their low cost, light weight, and ability to function as anodes in metal/air battery using a variety of electrolytes.

A typical aluminum/air cell comprises a body of aqueous electrolyte, a sheet-like air cathode having one surface exposed to the electrolyte and the other surface exposed to air, and an aluminum alloy anode member (e.g. a flat plate) immersed in the electrolyte in facing spaced relation to the first-mentioned cathode surface.

Aqueous electrolytes for metal-air batteries consist of two basic types, namely a neutral-pH electrolyte and a highly alkaline electrolyte. The neutral-pH electrolyte usually contains halide salts and, because of its relatively low electrical conductivity and the virtual insolubility of aluminum therein, is used for relatively low power applications. The highly alkaline electrolyte usually consists of NaOH or KOH solution, and yields a higher cell voltage than the neutral electrolyte.

In neutral-pH electrolyte, the cell discharge reaction may be written:

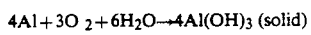
$4Al + 3O_2 + 6H_2O \rightarrow 4Al(OH)_3$ (solid)

In alkaline electrolyte, the cell discharge reaction may be written:

$4Al + 3O_3 + 6H_2O + 4KOH \rightarrow 4Al(OH)_4^- + K^+$ (liquid solution), followed, after the dissolved potassium (or sodium) aluminate exceeds saturation level, by:

$4Al(OH)_4^- + 4K^+ \rightarrow 4Al(OH)_3 (solid) + 4KOH$

In addition to the above oxygen-reducing reactions, there is also an undesirable, non-beneficial reaction of aluminum in both types of electrolyte to form hydrogen, as follows:

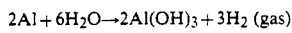
$2Al + 6H_2O \rightarrow 2Al(OH)_3 + 3H_2$ (gas)

There is a need for a metal-air battery which can be used as an emergency power source at locations where electric supply lines do not exist. Such a battery must have a high energy capacity and a high power density and be capable of running for a long period of time under high load. When the battery is run under high load, not only do large amounts of aluminum hydroxide accumulate in the electrolyte, but quantitites of hydrogen also form from the surface of the electrolyte. As with other batteries this hydrogen can easily reach explosive concentrations. Considerable heat is also evolved, resulting is evaporative electrolyte loss.

A battery intended as an emergency power supply is described in U.S. Pat. No. 4,490,443, issued Dec. 25, 1984. That battery uses a plurality of individual metal air cells with an electrolyte recirculated through the cells by means of a centrifugal or impeller pump. It is capable of operating under high load, but it has major disadvantages in that the individual cells are not easily exchanged when the anode is depleted, it does not provide a means for managing accumulated solids, the entire battery is dependent on a single pump and it does not provide a satisfactory means for avoiding hydrogen build-up in the electrolyte reservoir.

It is an object of the present invention to develop a battery capable of long-time operation under high load which does not have the above disadvantages.

SUMMARY OF THE INVENTION

The battery of the present invention is characterized by having a supply reservoir for the electrolyte enclosed in a housing below a plurality of individually removable metal-air cells. A support panel is mounted directly above the electrolyte reservoir and individually removable metal-air cells are mounted in side-by-side relationship on the support panel with air gaps therebetween. Each cell comprises a pair of spaced-apart flat side walls joined by side edge faces and top and bottom edge faces. The flat side walls include air cathodes and a metal anode is mounted between the flat side walls containing the air cathodes in facing spaced relationship to the cathode surfaces. Each cell includes an electrolyte inlet connection in a low region below the bottom of the anode and an electrolyte outlet connection, those inlet and outlet connections being adapted to removably extend through openings in the support panel. The inlet connector is flow connected to pump means for pumping electrolyte from the reservoir and the outlet connector is adapted to return electrolyte to the reservoir. The battery is completed by circuit means for connecting the cells in series to each other and to an external load.

According to one preferred feature of the invention, the electrolyte inlet and outlet connectors are short tubular members which extend through holes in the support panel. The inlet tubes preferably include O-rings to provide a snug fit within the holes in the support panel and extend into a manifold chamber positioned directly beneath the support panel. This manifold chamber is fed by pump means which fills the manifold and forces the electrolyte upwardly through the inlet tubes and into the metal-air cells.

The outlet tubes extend through the support panel at locations beyond the manifold so that returning electrolyte can flow from the outlet tubes directly into the electrolyte reservoir.

Another preferred feature of the invention is the design of the metal-air cells. Preferably, each cell includes a vertical divider wall extending from the bottom edge face up to a short distance below the top edge face. This divider wall provides an electrolyte chamber connected to the electrolyte inlet tube and an overflow chamber connected to the electrolyte outlet tube. The top end of the divider wall forms an electrolyte overflow weir and is positioned at or above the top end of the metal anode. With this arrangement, the electrolyte flows upwardly through the metal-air cells and provides a strong flushing action to remove metal hydroxide reaction products formed in the space between the anode and cathode. Thus, the metal hydroxide product is carried upwardly and over the weir for discharge back into the reservoir. This reaction product settles to the bottom of the reservoir and the battery can operate for a considerable period of time before it is necessary to remove the collected solid reaction product from the bottom of the reservoir. It is desirable to seed the reservoir with Al(OH)$_3$ particles.

According to another preferred feature of the battery of this invention, the electrolyte reservoir also includes a divider wall which extends upwardly for part of the height of the reservoir to provide a further overflow weir. The electrolyte flowing over the internal weir of the reservoir is substantially free of the solid reaction product and pump inlets are positioned in the reservoir on the downstream side of the weir.

The electrolyte pump may be in the form of a single pump or several small centrifugal pumps may be used. By using several small pumps, the battery can be made more compact and there is the further advantage that the failure of one pump will not shut down the battery. The pumps are preferably submersible centrifugal pumps which are mounted in the reservoir on the downstream side of the weir. These pumps preferably discharge into a first holding tank or manifold from which a plurality of connector lines connect to the manifold positioned beneath the inlets to the metal-air cells. It is also preferable that some, but not all, of the pump outlet lines include check valves to prevent reverse flow of electrolyte.

When a single pump is used, it is preferably in the form of a column pump with an impeller submersed in the electrolyte and a motor mounted above the electrolyte. The single pump can be used with a single larger discharge pipe and no manifold.

In order to intensify the supply of air to the gaps between the metal-air cells, a blower and air distributor are preferably installed adjacent the cells to blow air through the gaps. According to a preferred feature, this air is used for a secondary purpose of flushing the surface of the electrolyte in the reservoir. It has been found that in high load batteries of this type, there can be build-up of hydrogen on the surface of the electrolyte and this can reach explosive levels. To avoid this problem and dilute the hydrogen concentration in the reservoir, openings are preferably provided in the support panel between the metal-air cells at the side of the cells remote from the blower. In this manner, the air passing in one direction through the gaps between the cells is forced down through the openings in the support panel and across the surface of the electrolyte in the reverse direction, thereby diluting the hydrogen. This air can then be discharged through a demister and a condenser to the atmosphere.

Also, to control the temperature of the electrolyte, a heat exchanger may be provided through which electrolyte is recirculated from the reservoir. When high electrical outputs are required from the battery, the condenser can be replaced by a second heat exchanger and the air can be discharged directly to the atmosphere.

These and many other features and advantages of the invention will become apparent as the invention becomes better understood by reference to the following detailed description when considered in conjunction with the accompanying drawings wherein:

FIG. 1 is a schematic view of a metal-air battery with covers removed;

FIG. 2 is a perspective view of a cover for the metal-air cells;

FIG. 3 is a perspective view of a cover for the condenser and heat exchanger;

Figure 4:
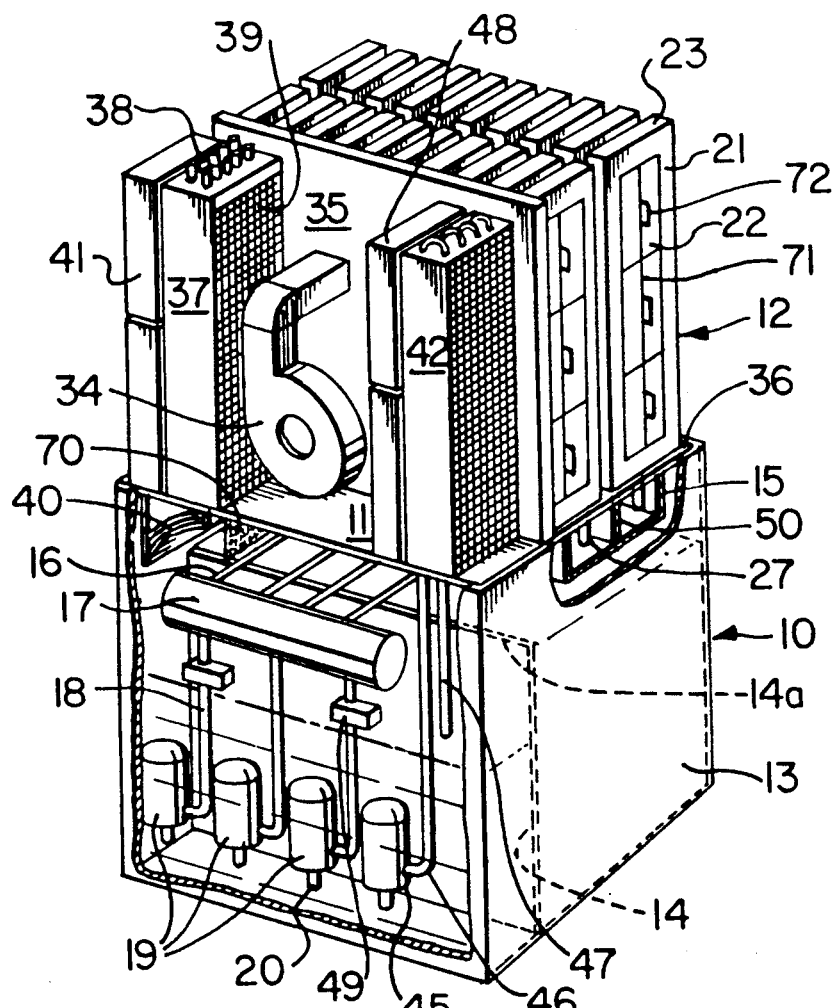
FIG. 4 is a further schematic illustration of the battery.

Referring now to the drawings, a housing 10 with side walls 13 is provided comprising a suitable material resistant to caustic solutions at temperatures up to 95° C., such as polypropylene or 316 stainless steel, and serving as an electrolyte reservoir. Extending across an upper region of the interior of housing 10 is a support panel or platform 11. At one side of the housing, there are gaps 36 in the support panel, providing air openings into the electrolyte reservoir.

Extending upwardly from and supported by the support panel 11 are a plurality of metal-air cells 12 with air gaps therebetween. These cells 12 have a long, flat rectangular shape with side walls 21 having window openings retaining air cathodes 22.

The air cathodes 22 are generally rectangular sheet member fabricated of activated carbon and incorporating an electrically conductive material such a wire mesh. Each cathode 22 extends entirely over an opening in wall 21 with its edges sealingly adhered to the interior surface of the wall around the periphery of the opening. The cathodes in the two side walls are preferably electrically connected such that they effectively form a single cathode surrounding the anode spaced between them. The cathodes are susceptible to hydrostatic deformation which affects the gap between the anode and cathode. To avoid this problem, a supporting grid 71 is provided across the opening in wall 21 and small projections 72 are provided on the outer edges of the grid 71. These projections 72 are arranged so that the projections of adjacent pairs of cells engage each other, thereby providing a rigid structure while permitting free flow of air between the cells.

The side walls 21 are joined by a removable top lid 23, a pair of end walls 24 and a bottom wall 25, the lid 23 tightly sealing within walls 21 and 24. The anode 26 has a vertically extending tab 75 projecting upwardly through a slot in lid 23, and similarly the cathode has a connector lead 76 extending from the side of the cell where the two cathodes are joined. The tab 75 and lead 76 are connected to suitable circuit means (not shown) for connecting the cells in series to each other and to an external load.

A divider wall 30 is formed between side walls 21 near one end wall 24 to form a narrow discharge conduit 32 adjacent the side edge. This divider wall 30 terminates at an upper edge 31 a short distance below the cell top edge 23, the edge 31 forming an overflow weir. Vertical slots are provided in divider wall 30 and side wall 24 to retain an aluminum anode 26. This anode terminates slightly below the top edge 31 of divider wall 30. An inlet tube 27 connects to bottom edge 25 beneath the anode 26 and an outlet tube 33 connects to bottom edge 25 directly below the discharge conduit 32. These pass through holes 29 and 29a respectively in support panel 11. Preferably the tube 27 is provided with annular grooves containing O-rings 28 which snugly seal the tube 27 within hole 29. The discharge tube 33 is formed slightly smaller than hole 29a to facilitate inserting and withdrawing the metal-air cell 12. To prevent leakage of air through holes 29a, a thin foam or rubber pad with small holes may be placed on the panel 11 over the holes 29a. The discharge tubes pass through the small holes in the pad and then through the larger holes 29a.

Immediately below the inlet tubes 27 is mounted a manifold or manifolds 15 extending across beneath support panel 11. Preferably there is a divider wall 50 providing two manifolds, one for each aligned row of metal-air cells. As shown in FIG. 3, four inlet tubes 16 feed into the manifold 15, two of these tubes feeding into one half of the manifold and two into the other half. The inlet end of the four tubes 16 connect to a second manifold 17 which in turn connects to three submersible centrifugal pumps 19 by way of outlet lines 18. Two of the three outlet lines 18 are provided with reverse flow check valves 49. The pumps 19 have inlets 20 which are preferably positioned well above the bottom of the electrolyte reservoir. All tubing, connectors and manifold are preferably made of a non-conducting material in order to reduce possible shunt currents.

The electrolyte reservoir preferably has a divider wall 14 with an upper edge 14a forming an overflow weir. As can be seen from FIG. 1, the electrolyte will, after some discharge time has elapsed, have a higher level to the right of the weir and a lower level to the left of the weir. Partially clarified electrolyte overflows from the right side to the left side of the weir.

Inlets 20 for pumps 19 are positioned in the downstream side of the reservoir for pumping partially clarified electrolyte up through manifolds 17 and 15 and through the metal-air cells 12. The electrolyte travels from the manifold 15 in an upward direction through the gaps between the anode and cathodes simultaneously flushing any reaction product formed in the gaps. The electrolyte with reaction product is carried over the weir 31 and down discharge conduit 32 and outlet 33 back into the upstream side of the electrolyte reservoir. The reaction product S settles to the bottom of the upstream side with the partially clarified electrolyte flowing over the weir for recycle through the metal-air cells.

An air distributor wall 35 is provided adjacent the metal-air cells 12 with openings 66 opposite the gaps between the cells for discharge of air through the gaps. A blower 34 feeds air to the distributor wall 35, this blower being powered by electricity generated by the battery. In operation, the compartment containing the metal-air cells is sealed within a cover as shown in FIG. 2 except for the air inlets 66 and the gaps 36 in the support panel 11. This compartment cover includes the air distributor wall 35, a pair of side walls 56, an end wall 57 opposite wall 35 and a removable lid 58. The walls 35, 56 and 57 are tightly sealed together and the bottom edges of the four walls are tightly sealed to the top of the housing 10, while the lid 58 is tightly connected to the top edges of the four walls. Alternatively, the lid 58 may be sealed to the walls and the entire compartment cover may be removable. Thus, when the blower 34 is in operation, air is blown across through the gaps between the metal-air cells 12 and down through the support panel openings 36 into the reservoir. The air then travels in the reverse direction across the surface of the electrolyte in the reservoir, picking up hydrogen, and is discharged to the atmosphere upwardly through a plurality of metal tubes 38 of condenser 37. Heat exchange in the condenser is enhanced by means of a plurality of mechanically bonded metal fins 39 through which air is blown from fans 41. Alternatively, the condenser may be water cooled.

The moist air which travels across the reservoir accumulates caustic mist and hydrogen. It is desirable to remove the caustic mist before the air enters the condenser tubes 38 and this can be done by means of a demister curtain 70 hanging across the reservoir above the electrolyte and by means of a demister unit 40. The demister unit 40 is positioned directly below the inlets to condenser tubes 38 and comprises layers formed of plastic fibre pads. These pads are mounted on an incline to facilitate draining of collected caustic mist back into the reservoir.

The electrolyte may be cooled by means of a heat exchanger 42, the heat exchange taking place between metal tubes and metal fins by way of air fans 48. The electrolyte is pumped by way of pump 45 upwardly through tube 46, through the heat exchanger and is discharged back into the reservoir via discharge line 47. The operation of the heat exchanger fans is controlled by a thermal switch set to a predetermined temperature.

The condenser and heat exchanger may be protected by a cover 60 as shown in FIG. 3 and consisting of two sides 61, one end wall 63 and a top wall 64. Side walls 61 contain openings 62 to permit free flow of air around the condenser, heat exchanger and circulating air blower. The top wall 64 has an outlet 65 serving as an exhaust from condenser tubes 38. This outlet 65 may be connected to an exhaust vent.

A small auxilliary battery is used to start the battery of the invention, this auxilliary battery being connected to the pumps 19. Thus, when the pumps 19 are activated, they commence pumping electrolyte upwardly through manifolds 17 and 15. Since gas may accumulate in the manifolds, it is desirable to provide a means for venting gas before it passes upwardly through the metal-air cells by providing small holes in the upper regions of the side walls 51 of manifold 15. After the gas is fully eliminated from the manifold, there continues to be a slight flow of electrolyte through the holes. As soon as the electrolyte makes contact between the anode and cathode, electricity generation commences and the auxilliary battery is no longer required. The pumps 19 and 45, the blower 34 and the fans 41 and 48 are all driven by excess power from the battery of the invention. It is also possible to provide a manual pumping device to start the battery, thereby avoiding the need for the auxiliary battery.

The three pumps 19 provide a sufficiently excess flow capacity that two of the three pumps can fail and sufficient electrolyte will still be pumped to fill the metal-air cells with electrolyte and keep the battery operational. In order to prevent a flow short circuit through a failed pump, reverse flow check valves 49 are provided on all except one pump.

When it is desired to stop the battery for any reason, such as replacing the metal-air cells, it is simply a matter of stopping the pumps whereby the electrolyte drains out of the metal-air cells and the cells can be replaced. Thus, the battery can be placed back into immediate operation and individual cells can be opened and the anodes replaced at a convenient time.

In order to flush the system, a one-way discharge valve outlet may be provided in a side wall 13 of housing 10 at a level above the highest permissible accumulation of reaction product solids 5 and below the level of weir 14a. Thus, with the one-way valve in the open position, water can be fed into the pump side of the electrolyte reservoir and then circulated through the pumps and cells into the upstream side of the electrolyte reservoir. Simultaneously, liquid flows from the reservoir out through the one-way valve. In this manner, all caustic except for that held within the solids deposit S may be flushed out of the battery.

Figure 5:
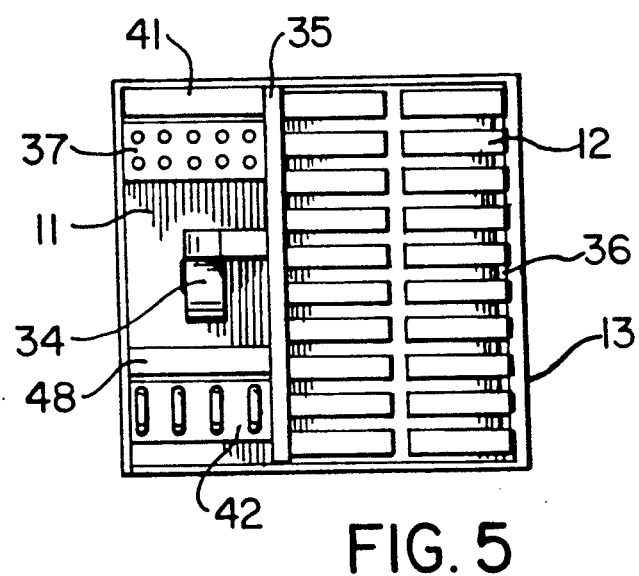
FIG. 5 is a top plan view of the battery with cover removed.
Figure 7:
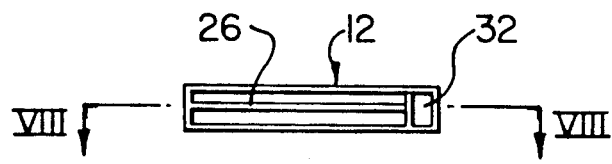
FIG. 7 is a cross-sectional view of a metal-air cell.
Figure 6:
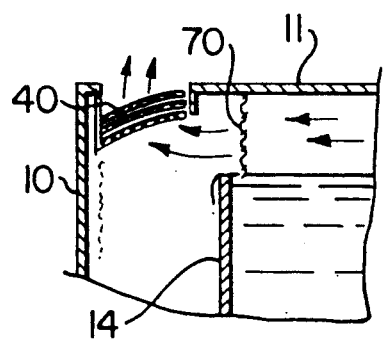
FIG. 6 is a sectional view of a demister.
Figure 8:
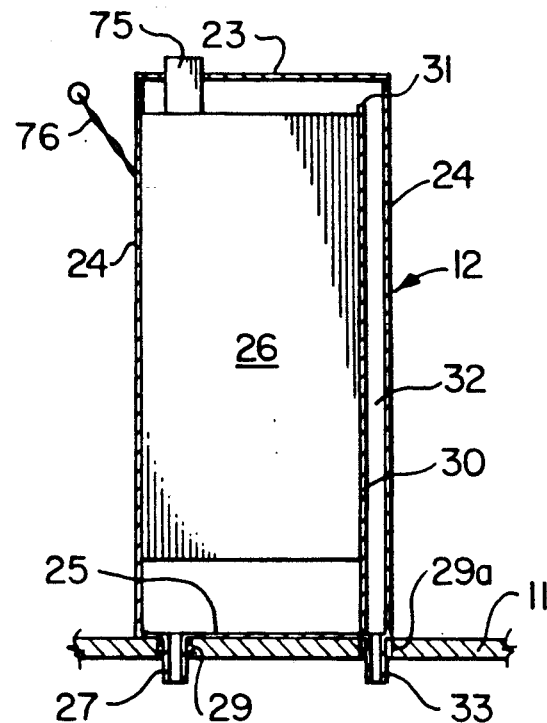
FIG. 8 is a cross-sectional view along line VII—VII of FIG. 7.
Figure 9:
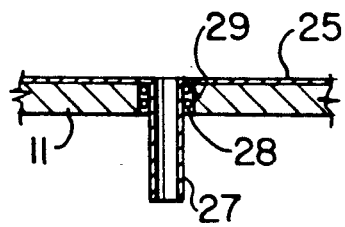
FIG. 9 is a detailed sectional view of a cell inlet.
Figure 10:
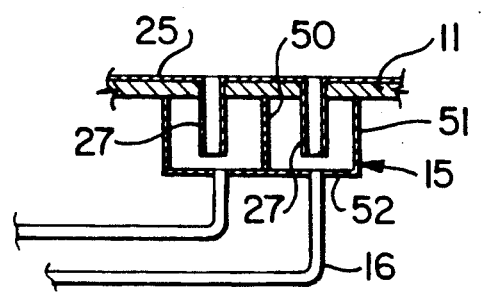
FIG. 10 is a detailed sectional view of the inlet manifold.

A battery of the design shown in FIGS. 1-8 was produced with 20 removable aluminum-air cells. Each aluminum anode had a thickness of 13 mm, a height of 18.2 cm and a width of 11.1 cm. The cathodes used were type AE-20 gas-diffusion cathodes made by Electromedia Inc. The cells each had a thickness of 1.7 cm, a height of 23.0 cm and a width of 13.0 cm.

The electrolyte was 5M KOH with 0.005M sodium stannate and it was pumped through the aluminum-air cells at a flow rate of 15 l/min. Air was circulated between the cells and through the reservoir at a rate of about 28 l/min. This battery provided over 500 watts continuously for more than 60 hours with an output current of approximately 19 amps. The battery also had a net energy output of over 300 watt-hours per kg of battery weight.

I claim:

1. A battery reservoir comprising a tank having side walls and a bottom wall defining a reservoir for liquid electrolyte, a divider wall extending across between opposed side walls and extending upwardly to a height less than said side walls, said divider wall forming an overflow weir between an upstream compartment and a downstream compartment, at least one pump mounted in the downstream compartment, a first electrolyte manifold mounted in the reservoir above the downstream compartment, conduits flow connecting outlet(s) of said pump(s) to said first manifold, a second electrolyte manifold mounted in the reservoir above the upstream compartment and conduits flow connecting said first manifold to said second manifold, said second manifold being adapted to feed electrolyte upwardly through metal-air cells.

2. A battery reservoir according to claim 1 wherein at least one of said conduits connecting a pump to the first manifold includes a reverse flow check valve.

3. A battery reservoir according to claim 1 which includes an air-cooled heat exchanger mounted above the downstream compartment for cooling the electrolyte.

4. A metal/air cell for use in a battery and adapted for flow connection to an electrolyte reservoir, said cell comprising a pair of spaced-apart flat side walls joined by end faces and top and bottom faces, said side walls including air cathodes, a metal anode mounted between and spaced from said flat side walls, an electrolyte inlet connector below the lower edge of the anode and an electrolyte outlet connector, and a vertical internal divider wall extending from the bottom face to a short distance below the top face, said divider wall forming an electrolyte chamber connected to said electrolyte inlet connector and an overflow chamber connected to said electrolyte outlet connector, with the top end of said divider wall being positioned above the top end of the metal anode and forming an electrolyte overflow weir, said inlet connector being adapted to flow electrolyte upwardly through the electrolyte chamber and over the weir into said overflow chamber and said outlet connector being adapted to return electrolyte to said reservoir.

5. A metal/air cell according to claim 4, wherein said inlet connector is flow connected to an electrolyte recirculating pump.

6. A metal/air cell according to claim 5, wherein the pump is connected to the inlet connector through an electrolyte manifold.

7. A metal/air cell according to claim 5, wherein the electrolyte outlet connector is flow connected to the reservoir by means of a drain tube.

8. A metal/air cell according to claim 4, wherein two said cells are arranged in two side-by-side rows with the cells in the two rows being aligned in side-by-side operative pairs.

9. A metal/air cell according to claim 8, wherein each cell is individually removable.

10. A metal/air cell according to claim 4, wherein the metal anode is an aluminum or aluminum alloy anode.

11. A metal/air cell according to claim 10, wherein each air cathode is a sheet member fabricated of activated carbon and extending over an opening in a cell side wall.

12. A battery comprising:
 (a) a tank defining a reservoir for liquid electrolyte,
 (b) at least one support panel mounted above the electrolyte reservoir,
 (c) a plurality of metal-air cells mounted in side-by-side relationship on said support panel with air gaps therebetween,
 (d) means for pumping liquid electrolyte upwardly through said metal/air cells and then downwardly into said reservoir, and
 (e) blower means and air distributor means for blowing air through said air gaps.

13. A battery according to claim 12, wherein the electrolyte reservoir includes a divider wall forming an overflow weir, with the cells being arranged to discharge electrolyte into the reservoir on the upstream side of the weir.

14. A battery according to claim 13, which includes a heat exchanger mounted on a support panel above the reservoir on the downstream side of the weir, said heat exchanger being adapted to cool electrolyte in said reservoir.

15. A battery according to claim 14, which includes a fan for air cooling said heat exchanger.

16. A battery according to claim 13, which includes an air-cooled condenser mounted on a support panel above the reservoir on the downstream side of the weir.

17. A battery according to claim 16, which includes a demister for removing caustic mist from air entering the condenser.

* * * * *